United States Patent
Chemishkian et al.

(10) Patent No.: US 9,754,139 B2
(45) Date of Patent: Sep. 5, 2017

(54) REAL-TIME WIRELESS POWER TRANSFER CONTROL FOR PASSIVE BACKSCATTERING DEVICES

(71) Applicants: Sergey Chemishkian, Cupertino, CA (US); Daniel Arnitz, Durham, NC (US); Matthew S. Reynolds, Durham, NC (US)

(72) Inventors: Sergey Chemishkian, Cupertino, CA (US); Daniel Arnitz, Durham, NC (US); Matthew S. Reynolds, Durham, NC (US)

(73) Assignees: RICOH CO., LTD, Tokyo (JP); DUKE UNIVERSITY, Durham, NC (US)

( * ) Notice: Subject to any disclaimer, the term of this patent is extended or adjusted under 35 U.S.C. 154(b) by 263 days.

(21) Appl. No.: 14/042,417

(22) Filed: Sep. 30, 2013

(65) Prior Publication Data
US 2015/0091706 A1    Apr. 2, 2015

(51) Int. Cl.
G06K 7/10    (2006.01)
H02J 17/00    (2006.01)
H02J 5/00    (2016.01)
H02J 50/20    (2016.01)

(52) U.S. Cl.
CPC .......... G06K 7/10158 (2013.01); H02J 17/00 (2013.01); H02J 50/20 (2016.02)

(58) Field of Classification Search
CPC .... G06K 7/0008; G06K 7/10; G06K 7/10158; G06K 7/10168; G06K 7/10178; G06K 7/10217; G06K 7/10009; H02J 5/00; H02J 5/005; H02J 17/00

USPC .......... 340/10.3, 10.31, 10.32, 10.33, 10.34, 340/10.5, 10.1–10.6, 572.1–572.7
See application file for complete search history.

(56) References Cited

U.S. PATENT DOCUMENTS

| | | | | |
|---|---|---|---|---|
| 2004/0127245 | A1* | 7/2004 | Sadri | H04W 52/42 455/522 |
| 2007/0201344 | A1* | 8/2007 | Miyabayashi | H04L 27/2608 370/203 |
| 2010/0271179 | A1* | 10/2010 | Maltseff | G06K 19/0723 340/10.1 |

(Continued)

OTHER PUBLICATIONS

Matthew S. Trotter, Survey of Range Improvement of Commercial RFID Tags With Power Optimized Waveforms, 2010, IEEE RFID, pp. 195-196.*

Primary Examiner — Brian Wilson
(74) Attorney, Agent, or Firm — Blakely, Sokoloff, Taylor & Zafman LLP (57) ABSTRACT

A method and apparatus is disclosed herein for real-time wireless power transfer control. In one embodiment, a system comprises: an RF-energy harvesting sensor tag operable to generate a first backscatter signal and at least one base station operable to deliver RF power to the sensor tag by emitting a first waveform comprising a plurality of subcarriers, wherein the first backscatter signal is generated by the sensor tag by modulated scattering of the first waveform as incident upon the sensor tag, and further wherein the at least one base station subsequently emits a second waveform determined at least in part by a closed-loop feedback control algorithm responsive to measurements of the first backscatter signal.

19 Claims, 9 Drawing Sheets

(56) References Cited

U.S. PATENT DOCUMENTS

2013/0147609 A1\* 6/2013 Griffin .............. G06K 7/10158
340/10.5

\* cited by examiner

REAL-TIME WIRELESS POWER TRANSFER CONTROL FOR PASSIVE BACKSCATTERING DEVICES

FIELD OF THE INVENTION

Embodiments of the present invention relate to the field of wireless power transfer; more particularly, embodiments of the present invention relate to wireless power transfer for passive backscattering devices (e.g., RF energy harvesting sensor nodes with backscatter capabilities).

BACKGROUND OF THE INVENTION

Radio Frequency Identification (RFID) tags are becoming increasingly common. RFID tags that include sensing capabilities have emerged as a generally inexpensive and effective means of addressing many wireless sensor applications in both indoor and outdoor sensing applications. Purely passive sensors, such as RFID tags, when actively interrogated by an RF transceiver/reader, receive energy to power themselves up so that they can acquire readings from their attached sensing elements. Generally, RFID tags equipped with one or more sensors require a source of energy to measure and store their acquired information at times other than during active interrogation by a reader. Standard passive (battery-less) RFID tags provide no means of acquiring sensor information when they are outside the communication range of a reader.

Next generation sensor networks may be powered by energy harvesting techniques to avoid requiring battery maintenance. Energy harvesting is a process by which energy is derived from external sources (e.g., radio frequency energy, solar power, thermal energy, wind energy, salinity gradients, or kinetic energy), captured and stored.

Energy may be harvested from radio frequency signals propagating wirelessly. With RF harvesting, wireless energy comes from a radio frequency transmitting device that is some distance away from a device that harvests energy from the radio frequency transmission.

One of the more popular forms of RF used today is Wi-Fi (also referred to as IEEE 802.11a/b/g/n etc.) communications. Today, most Wi-Fi communications are in the 2.4 GHz and 5.8 GHz frequency bands and there are many local area networks that are based on Wi-Fi in which access points enable Wi-Fi clients to gain access to networks such as the Internet. Furthermore, the 2.4 GHz and 5.8 GHz bands also support other networking standards, such as Zigbee and Bluetooth, and other proprietary networks, each transmitting energy by communicating in this same frequency band. Additionally there are other frequency bands that support different communication protocols, each of which transmit energy when they are communicating.

In a traditional RFID-like setup the RFID readers (interrogators) usually deliver RF power as a continuous wave (CW), i.e. a sinusoidal signal of a particular frequency. In a traditional system with several readers, a combination of time-sharing between the readers, and a defined frequency allocation plan is used to increase information throughput of the system as a whole. In addition to its spectrum sharing advantages, frequency planning/frequency hopping is also an important mechanism used to combat the effects of frequency-dependent fading in the typical multipath environment. If a transponder is in a particular location exhibiting a deep RF fade (sometimes called a null) at one frequency, a relatively small change in frequency is likely to move it out of the RF fade.

Increasing the amount of incident power at transponder is an important problem, as it typically leads to the increase in both the harvestable energy, and the energy available for communications (backscatter). However, the transmit power of the interrogators (readers), is ultimately limited because of regulations imposed by regulatory bodies (the FCC in case of the USA), capping the emitted RF power at certain levels specific to each RF band. Also, increasing the transmit power is not the most efficient approach in case of multipath environment, or in face of a highly nonlinear behavior of the harvester element (such as one or more diodes or diode-connected transistors) of the transponder device, as it precludes selective manipulation of power delivered to transponders. Ultimately one may want to boost energy flow to some transponders, while starving some other transponders, where this energy allocation may be adjusted over time according to certain schedule.

In attempt to maximize the efficiency of diode-based RF energy harvesters, Durgin et al., described the use of power-optimized waveforms (POWs). In the POW method one replaces the traditional single-frequency continuous wave (CW) RF signal with a particular complex waveform comprised of multiple frequency components (subcarriers), optimized for a particular RF energy harvester circuit (such as a rectenna with voltage boost circuit) to provide the maximum amount of harvestable energy at a particular average power level. POWs take advantage of highly nonlinear behavior of rectifier element in harvesters at low incident power levels, by "squeezing" energy in shorter bursts to maximize the peak RF voltage, while holding the average power at the same level. This technique results in significant boost in the harvester efficiency, especially pronounced at low incident power levels close to the harvesting threshold—see FIG. 2b. Note, that for a given set of tunable elements, a POW is a function of particular harvester design. For more information, see US20110148221 (Trotter M.; Durgin G., GTRC), "Systems and Methods for Providing a Power Optimized Waveform," and Valenta, C.; Durgin, G. "Rectenna Performance Under Power-optimized Waveform Excitation," IEEE RFID Conference, 2013.

To overcome the effects of frequency selective fading, and to potentially derive an advantage from multipath RF environments, a Wireless Power Transfer (WPT) Optimization method proposed by D. Arnitz and M. Reynolds. This method consists of a MIMO base station, and a procedure to control the base station to selectively minimize or maximize incident power at transponders. They used measurements of backscatter signal amplitude and phase as received by the MIMO base station receivers (RX), as a proxy for the incident power at the transponder, and they have proven that under certain assumptions the problem of maximizing a weighted RF power at the MIMO base station receivers is equivalent to that of maximizing the incident power at the transponder. In the MIMO WPT optimization method the optimization parameters are amplitudes and phases of subcarriers at MIMO base station transmitters and/or transmitter (TX) antennas. For more information on the MIMO WPT Optimization method, see Arnitz, D.; Reynolds, M. S., "Wireless Power Transfer Optimization for Nonlinear Passive Backscatter Devices," IEEE RFID Conference, 2013 and Arnitz, D.; Reynolds M. S., "Multitransmitter Wireless Power Transfer Optimization for Backscatter RFID Transponders," IEEE Antennas and Wireless Propagation Letters, vol. 12, no., pp. 849-852, 2013 doi: 10.1109/LAWP.2013.2271984.

SUMMARY OF THE INVENTION

A method and apparatus is disclosed herein for real-time wireless power transfer control. In one embodiment, a system comprises: an RF-energy harvesting sensor tag operable to generate a first backscatter signal and at least one base station operable to deliver RF power to the sensor tag by emitting a first waveform comprising a plurality of subcarriers, wherein the first backscatter signal is generated by the sensor tag by modulated scattering of the first waveform as incident upon the sensor tag, and further wherein the at least one base station subsequently emits a second waveform determined at least in part by a closed-loop feedback control algorithm responsive to measurements of the first backscatter signal.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the present invention include RF tags and components in wireless communication systems (e.g., Wi-Fi communication systems) that provide power to such tags. The tags perform RF energy harvesting and include a backscatter transponders which provide an indirect indication of the RF power incident upon that tag. Such tags may be part of a sensor network. In one embodiment, the tags perform energy harvesting, collect and process sensor data, and communicate data using standard RF communication techniques (e.g., Wi-Fi).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of signals (e.g., infrared signals, digital signals, etc.); etc.

OVERVIEW

Techniques for routing RF energy from an RF power producing device (e.g., a base station) to passively powered sensor tags with RF backscatter transponders (e.g., RFID tags) are described herein. A sensor tag is a maintenance-free low-cost small-sized intelligent sensor node connected to a computer network (e.g., the Internet), which is well-known in the art. In one embodiment, the RF power emitting devices are MIMO base stations and one or more MIMO base stations produce the RF energy in the form of RF waveforms used to power the tags. In one embodiment, the techniques include enforcing target levels of RF energy harvested by a tag or a group of tags by enforcing the incident waveform at each tag by compensating (at least partially) for the presence of multipath in the communication channel. In one embodiment, the incident waveforms are power optimized waveforms (POWs). The compensation process may include the restoration of the envelope of the RF waveform as received by the sensor tag (as in a time-domain representation), or alignment of amplitudes and phases of subcarriers (as in a frequency-domain representation)

In one embodiment, the RF power producing devices (e.g., MIMO base station(s) transmitters) enforce a desired incident waveform at each tag and the waveforms are created by automatically compensating for impairments in the RF channel (e.g., channel impairments due to physical motion of reflective objects in the environment, motion of the base stations and/or tags, interference from other systems, and measurement noise), as well as for harvested energy targets.

Figure 1:
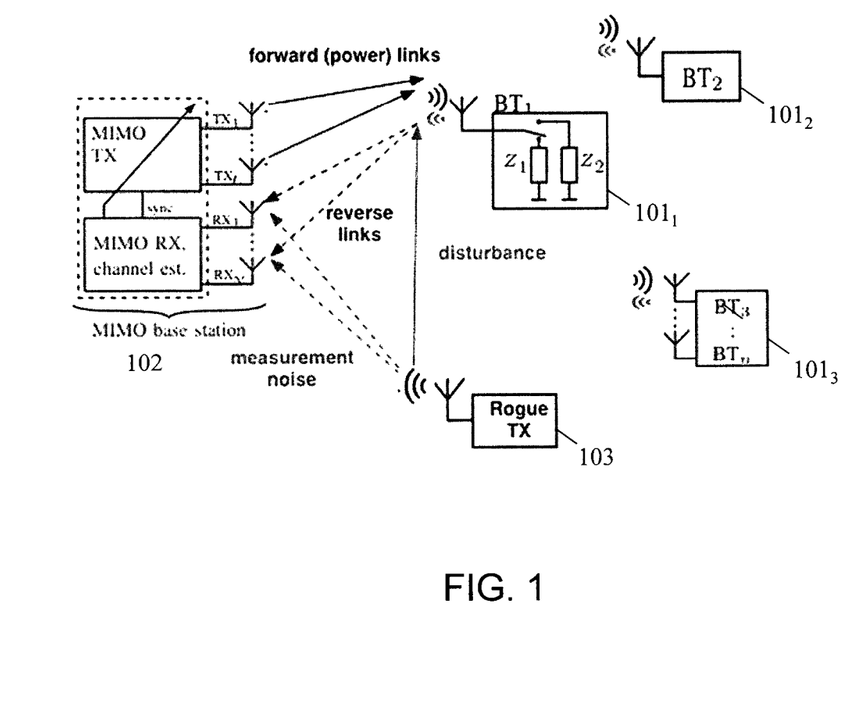
FIG. 1 illustrates one embodiment of a system for wirelessly transferring RF power from MIMO base stations to devices (e.g., backscatter tags BT).

FIG. 1 illustrates a system for wirelessly transferring RF power to devices (e.g., sensor tags). In one embodiment, the system of FIG. 1 may be part of a wireless communication system (e.g., a Wi-Fi communication system). Referring to FIG. 1, the system includes passive devices with backscatter transponders, or tags $101_1$-$101_3$. In one embodiment, one or more of tags $101_1$-$101_3$ comprise RFID tags. In another embodiment, one or more tags $101_1$-$101_3$ comprise passive sensor tags with backscatter communications. While only three are shown, the system may include more or less than three tags.

The system also includes a MIMO base station 102 that has multiple transmitters and multiple receivers. In one embodiment, the system may include more than one (e.g., 2, 3, etc.) base stations or other RF power producing devices. Base station 102 provides RF power to one or more of tags $101_1$-$101_3$ by wireless transmitting waveforms to those tags. In one embodiment, the waveforms are power optimized waveforms (POWs). In one embodiment, base station 102 is a wireless base station (access point) that generates and transmits a multi-tone continuous wave waveform at certain frequencies (e.g., 52 subcarriers in the case of 802.11g).

One or more receivers of base station 102 receive incident waveform signals backscattered from one or more of tags $101_1$-$101_3$. These incident signals are reflected via backscattering, from the one or more of tags $101_1$-$101_3$ in response to the waveforms sent by base station 102. These receivers may also receive RF noise or other disturbances from one or more other transmitters in the area, such as, for example, rogue transmitter 103.

Figure 2A:
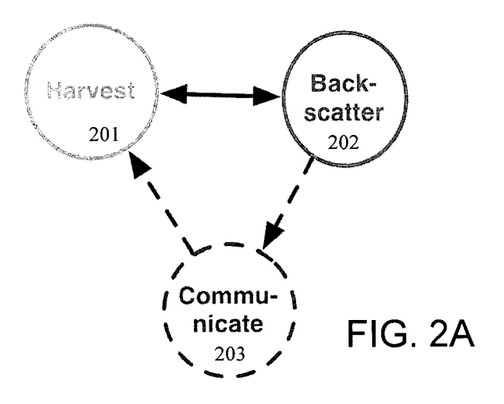
FIG. 2A illustrates the three modes of operation for one embodiment of tag.
Figure 2B:
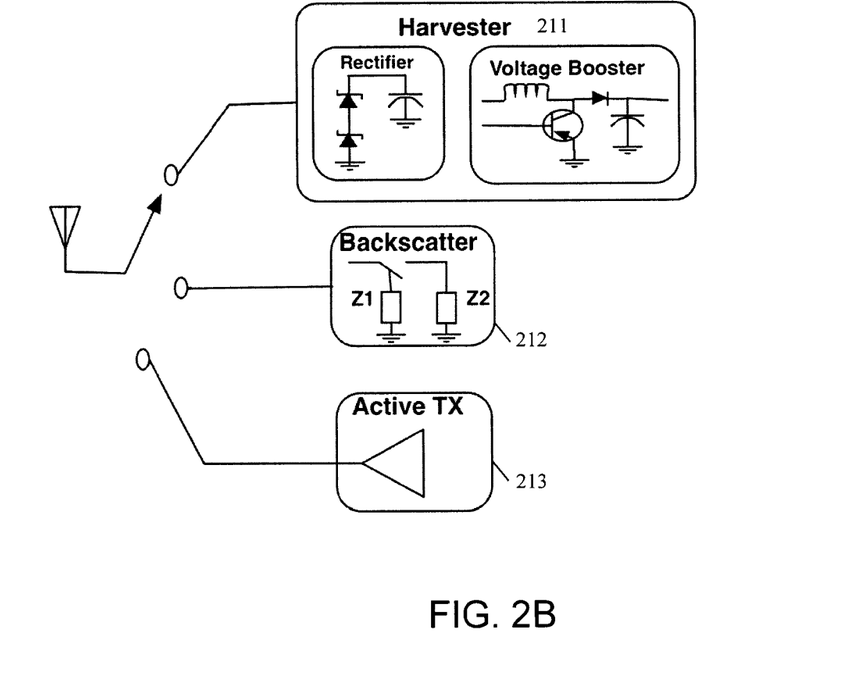
FIG. 2B illustrates three components of one embodiment of the tag that has the three modes of operation depicted in FIG. 2A.

In one embodiment, tags $101_1$-$101_3$ have three modes of operation: harvest mode 201, backscatter mode 202, and communicate mode 203. FIG. 2A illustrates the three modes of operation for one embodiment of tag. FIG. 2B illustrates three components of one embodiment of the tag that has the three modes of operation depicted in FIG. 2A.

During harvest mode 201, the tag is harvesting RF energy and not communicating or backscattering information. In one embodiment, the harvesting of RF energy is performed by a harvester 211 of a tag shown in FIG. 2B. The RF energy is harvested from waveforms (e.g., POWs) emitted by base station 102.

During backscatter mode 202, the tag is backscattering incident waveforms to base station 102 in response to the RF power waveforms being generated and sent by base station 102. In one embodiment, this is performed using backscatter communication mechanism 212 of a tag shown in FIG. 2B.

During communicate mode 203, the tag is generating and transmitting communications (other than the backscattering of incident signals responsive to RF power waveforms from base station 102). In one embodiment, this is performed using transmitter 213 of a tag shown in FIG. 2B. Such communications may be sensor data in the case the tag is a sensor tag. Note that these communications may be non-backscattered wireless communications such as, for example, Wi-Fi communications using a radio transmitter, or backscattered communications depending on the communication functionalities of the tag.

In one embodiment, the waveforms (e.g., POWs) being generated and sent to tags $101_1$-$101_3$ by base station 102 are monitored and adjusted using a feedback control system. In one embodiment, the feedback control system is part of, or used by, base station 102 to control the RF energy harvested by tags, such as tags $101_1$-$101_3$.

Figure 3:
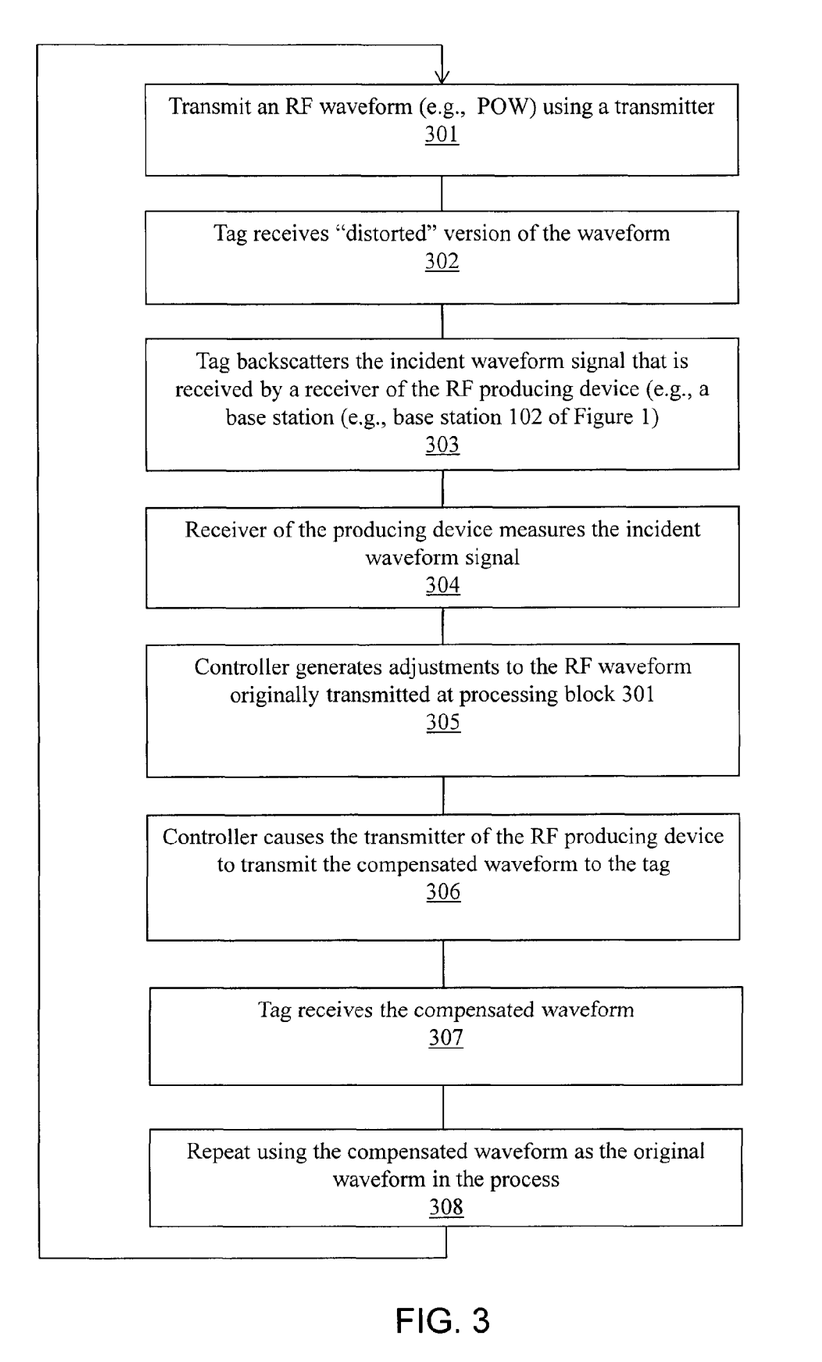
FIG. 3 is a flow diagram of one embodiment of an iterative feedback control process performed in the RF power delivery system employed by base stations and tags, such as those shown in FIG. 1.

FIG. 3 is a flow diagram of one embodiment of an iterative feedback control process performed in the RF power delivery system employed by base stations and tags, such as those shown in FIG. 1.

Figure 4:
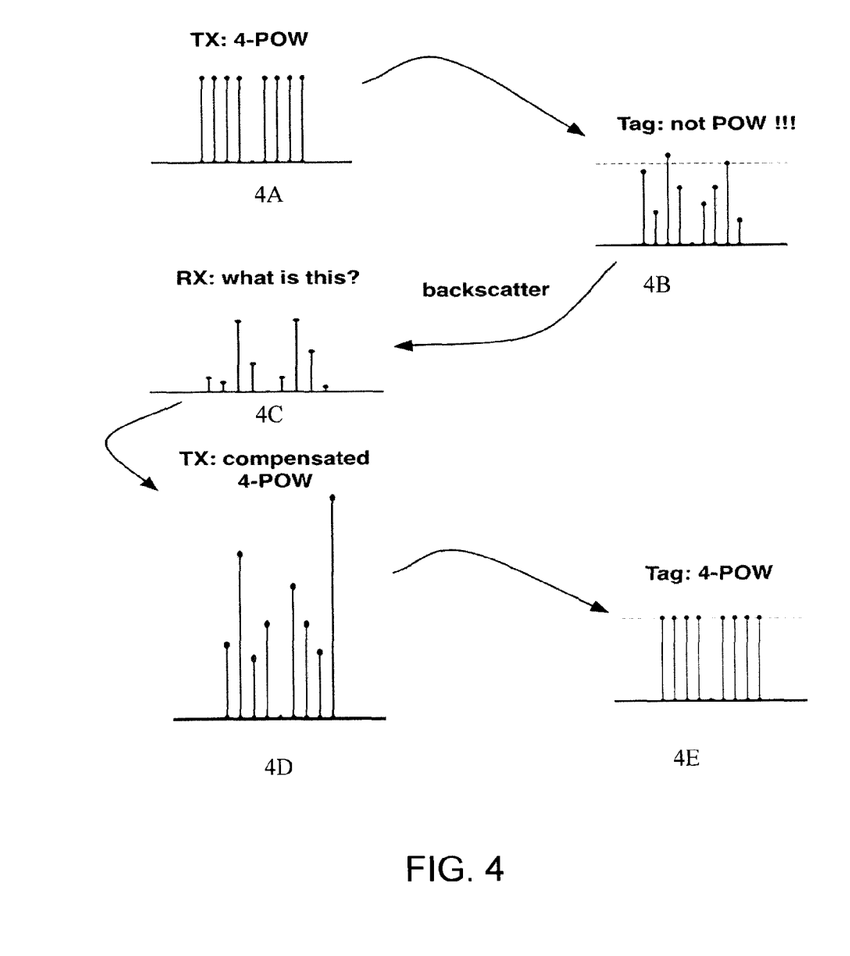
FIG. 4A illustrates an example of a transmitted POW.
FIG. 4B illustrates an example of a distorted POW of FIG. 4A received by a tag, after the effect of a non-line-of-sight channel is included.
FIG. 4C illustrates an example of the distorted POW of FIG. 4B backscattered by the tag and received by a base station.
FIG. 4D illustrates an example of a "compensated" POW computed by the controller and transmitted by the base station.
FIG. 4E illustrates an example of the "compensated" POW of FIG. 4D received by a tag.

Referring to FIG. 3, the process begins by transmitting an RF waveform (e.g., POW) using a transmitter (processing block 301). The transmitter may be from an RF emitting device, such as, for example, a base station (e.g., base station 102 of FIG. 1). FIG. 4A illustrates an example of a transmitted POW, in this example represented as a combination of eight distinct tones (subcarriers).

In one embodiment, the RF waveform is transmitted over a communication channel with one or more channel impairments, including one or more of multipath propagation, noise, and interference from other systems.

The transmitted waveform is carried via the communication channel to the receiver of a tag, which receives a distorted version of the waveform (processing block 302) due to the aforementioned impairments. FIG. 4B illustrates an example of the distorted POW of FIG. 4A received by a tag, represented again as relative amplitudes of subcarriers, after the effect of a non-line-of-sight channel is included. Using a backscatter communication mechanism built into the tag, the tag backscatters the incident waveform signal that is carried back through the communication channel and is received by a receiver of the RF producing device (e.g., a base station (e.g., base station 102 of FIG. 1)) (processing block 303). FIG. 4C illustrates the backscattered signal generated by a tag in response to the transmitted POW of FIG. 4A.

As part of receiving the backscattered signal, the receiver of the RF producing device measures the incident waveform comprising the signal as modified by the channel impairments (processing block 304). In one embodiment, the receiver measures subcarrier amplitudes and phases.

Based on the measurements, a controller of the RF producing device generates adjustments to the RF waveform originally transmitted at processing block 301 (processing block 305). In one embodiment, the adjustments are made to compensate for variations in channel gains, to adjust for changing harvested energy targets, to reject RF measurement noise, and/or to reject RF disturbance.

In one embodiment, the controller computes amplitude and phase adjustments to overcome the effects of channel impairments and applies them to the RF waveform generated by the RF emitting device. FIG. 4D illustrates an example of a compensated POW representing the original POW waveform of FIG. 4A modified with the amplitude and phase adjustments determined by the controller. Note that alternatively, instead of applying adjustments to the RF waveform, the controller could select a previously generated and stored waveform from among many previously stored waveforms that already represents the original RF waveform with the adjustments (or similar adjustments) made thereto, and then transmit this waveform. In such a case, there is no need to apply the adjustments to the original waveform.

By making the aforementioned amplitude and phase adjustments, the controller causes the transmitter of the RF producing device to transmit the compensated waveform to the tag (processing block 306), which the tag receives (processing block 307). FIG. 4E illustrates an example of the "compensated" POW of FIG. 4D received by the receiver of the tag in response to the transmission of the compensated waveform of FIG. 4D.

Thereafter, optionally, the process may be repeated using the compensated waveform as the original waveform in the process (processing block 308). The iterations may be one or more with a goal of increasing the RF energy that gets harvested by the tag.

Note that while the process of FIG. 3 in described in terms of one tag, the process described herein applies feedback control methods to track harvested energy targets for a population of tags, with the intent of selectively boosting or denying RF energy to tags. By tracking the harvested RF energy targets for multiple tags, an RF power producing device, alone or in cooperation with other RF power producing devices, is able to control, and potentially optimize, the RF energy distribution to a population of tags by enforcing incident waveforms (e.g., POWs) for individual tags. This may be done by enforcing desired amplitude and phase alignment of the frequencies (e.g., subcarriers) at the tags.

Furthermore, by tracking the harvested RF energy targets by the tags, the RF power producing devices can control of the RF power waveforms by compensating for variations in channel gain, by adjusting for changing harvested energy targets, by rejecting RF measurement noise, and by rejecting RF disturbance.

Wireless Power Transfer Via Feedback Control

As set forth herein, a RF emitting device (e.g., a multi-input multi-output (MIMO) base station or stations, etc.) delivers RF power to multiple RF-energy-harvesting backscatter tags (transponders) (e.g., low-power wireless sensor tags, conventional UHF RFID tags, etc.) in a controlled manner, wherein the RF emitting devices are controlled in order to manipulate (to increase or to decrease) harvestable RF energy available to each tag.

In one embodiment, the amount of harvestable RF energy delivered to passive backscatter transponders is controlled by using specifically identified waveforms in conjunction with dynamic, closed loop multi-target tracking. In one embodiment, a power-optimized waveform (POW) is designed for a particular RF energy harvester to increase the ratio of harvestable power vs. incident power. The alignment of amplitudes and phases of the power-optimized waveform (POW) is enforced at each tag by use of a single RF power producing device (e.g., MIMO base station), or multiple such devices, running a closed-loop control algorithm designed to constructively counter-act channel impairments.

The disclosed real-time waveform enforcement method enforces the power-optimal incident waveform in real time and in a closed loop manner to mitigate the presence of waveform distortions at the transponder caused by disturbance from "rogue" RF energy sources (e.g., Bluetooth devices, Zigbee devices, non-participating Wi-Fi devices, etc.), and also to mitigate any measurement noise from "rogue" sources that affecting the MIMO base station receivers. The disclosed techniques do not require RF power measurements or channel estimation by the transponder. Instead, the measurements of RF power reflected (backscattered) by the tag are performed at the RF power producing devices such as the MIMO base station(s). The control system attempts to deliver the prescribed amount of harvestable energy to each tag, adjusting as necessary to the presence of changing propagation losses and active disturbance from non-participating devices. In one embodiment, the waveform correction is achieved by use of a feedback control system designed to reject those disturbances.

Control System Model

The following notation is used to describe the control system model. The environment consists of following components:
- L of RF transmitters $\{TX_l | l=1,L\}$
- M of RF receivers $\{RX_m | m=1,M\}$
- N of tags with backscatter transponders $\{BT_n | n=1,N\}$
- K of subcarriers of frequency $\{f_k | k=1,K\}$ independently manipulated at each transmitter (antenna), and received (sampled) at each receiver antenna.

Figure 5:
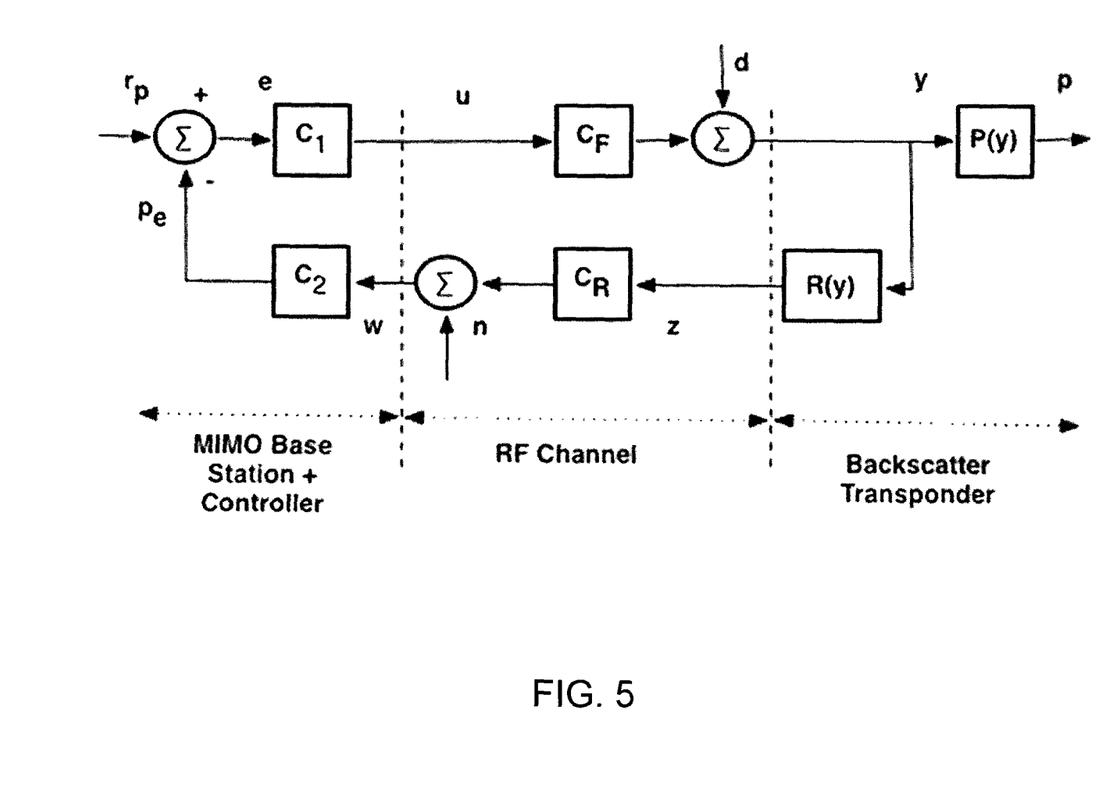
FIG. 5 illustrates a closed-loop control diagram of one embodiment of an RF power delivery system, such as the system described in FIG. 1.

FIG. 5 illustrates a closed-loop control diagram of an RF power delivery system, such as the system described in FIG. 1. The problem being solved is a target tracking problem of the form (1) in the presence of constrained control (3), where the waveform vector y is a linear combination of the attenuated control vector u and disturbance d:

$$\{p^*, y^*\} = \min \|P(y) - r_p\| \tag{1}$$

$$y = C_F u + d \tag{2}$$

$$F(u) \leq p_{TX\,max} \tag{3}$$

Additionally, the following notation is used: $\{f_k, k=1,K\}$ is a set of subcarrier central frequencies $f_k$. In various embodiments, the set covers a part or the whole RF band with constant or variable frequency increments between subcarriers. The selection of subcarriers may impact the computation of the POW for a particular transponder type.

$u=[u_1\ u_2\ \ldots\ u_L]$ is a (LK)×1 control vector that in one embodiment is comprised of L complex-valued vectors $u_k$, where each such vector is comprised of N×1 complex subcarriers (where complex subcarriers include both magnitude and phase information), as emitted by transmitters $\{TX_1\}$ $C_F$ is a forward channel gain matrix with dimensions (LK)×(NK). In one embodiment, each complex element of this matrix describes channel gain and phase change that the subcarrier of frequency $f_k$ emitted by the transmitter $TX_l$ undergoes on its path to the transponder $BT_n$ $d=[d_1 \; d_2 \ldots d_N]$ is a (KN)×1 complex disturbance vector. In one embodiment, the (KN)×1 complex disturbance vector is comprised of N vectors $d_n$ of incident waveforms from "rogue", or non-participating RF devices, where each K×1 vector $d_n$ describes K subcarrier amplitudes and phases of cumulative impairments at transponder $BT_n$.

$y=[y_1 \; y_2 \ldots y_N]$ is a (KN)×1 output vector of incident waveform. In one embodiment, the (KN×1) output vector of incident waveform is comprised of N vectors $y_n$, each K×1 vector $y_n$ is describing K subcarrier amplitudes and phases at each transponder $BT_n$. In one embodiment, the waveform y is a linear superposition of a path-attenuated control vector u and the impairment d, (see equation (2)).

$p=[p_1 \ldots p_N]$ is a N×1 vector of harvestable incident power at transponders 1 to N. In one embodiment, this vector is not measured directly.

$P(y)=\mathrm{diag}\{p_1(y_1) \; p_2(y_2) \ldots p_N(y_N)\}$ is a block-diagonal matrix of nonlinear functions $p_n(y_n)$ describing conversion of incident waveforms $y_n$ into harvested power $p_n$.

$R(y)=\mathrm{diag}\{R_1(y_1) \; R_2(y_2) \ldots R_N(y_N)\}$ is a (KN)×(KN) block-diagonal matrix of nonlinear functions $R_n(y_n)$ describing conversion of incident waveforms $y_n$ into reflected (backscattered) waveforms $z_n$. Usually these functions $R_n(y_n)$ can be approximated by the transponder complex gain factors (a.k.a. differential reflection coefficient (for more information on the MIMO WPT method, see Arnitz, D., et al., "Multi-Transmitter Wireless Power Transfer Optimization for Backscatter RFID Transponders," IEEE RFID Conference, 2013 and Arnitz, D., et al., "Multitransmitter Wireless Power Transfer Optimization for Backscatter RFID Transponders," IEEE Antennas and Wireless Propagation Letters, vol. 12, no., pp. 849-852, 2013 doi: 10.1109/LAWP.2013.22719841). In case of relatively narrowband waveforms and frequency-independent backscatter impedances, a transponder gain factor $R_n(y_n)$ may be reduced to a (K×K) unity matrix $I_K$ multiplied by a scalar gain factor $rr_n$.

$z=R(y)=[z_1 \; z_2 \ldots z_N]$ is a (KN×1) vector of backscattered waveform. In one embodiment, the (KN×1) vector of backscattered waveform is comprised of N vectors $z_n$, where each K×1 vector $z_n$ describes K subcarrier amplitudes and phases as reflected by each transponder $BT_n$ $C_R$ is the return channel gain matrix with dimensions (MK)×(NK). In one embodiment, each complex element of this matrix describes channel gain and phase change undergone by a backscattered subcarrier of frequency $f_k$ from transponder $BT_n$, on its path to a receiver $RX_m$.

$n=[n_1 \; n_2 \ldots n_N]$ is a (MK)×1 complex vector of measurement noise comprised of N $n_n$ vectors of incident waveform from "rogue" RF devices, where each K×1 vector $n_n$ describes K distinct complex interference sources at the RF receiver $RX_m$.

$w=[w_1 \; w_2 \ldots w_M]$ is a (MK)×1 output vector of waveforms measured at the MIMO base station. In one embodiment, this (MK)×1 output vector of waveforms is comprised of N vectors $w_m$, each K×1 vector $w_m$ describing K complex subcarrier amplitudes (including both magnitude and phase information) at each RF receiver $RX_m$. In one embodiment, the waveform w is a linear superposition of the return-path-attenuated backscattered waveform z and the noise n (see equation (2.2)).

$r_p=[r_p \ldots r_{pN}]$ is a N×1 reference (target) vector of harvestable power for transponders 1 to N.

$p_e$ is a N×1 estimate of harvested power produced from the measured noisy backscatter vector w by a dynamic estimator $C_2$ block N×(MK)

e is a N×1 tracking error vector resulting from closing the negative feedback loop, $e=r_p-p_e$ finally, $C_1$ is a dynamic forward controller block N×(LK) that generates a control vector u from the tracking error e.

The control system estimator and controller blocks $C_1$ and $C_2$ can be synthesized using various known optimal control techniques or optimization techniques, some of which are discussed below. One can also think of $C_1$ and $C_2$ as of dynamic filters in the forward and feedback paths.

The original optimal tracking problem (1)-(3) can be replaced with a more simple, two-step sub-optimal problem, described by equations (4)-(6) given below.

First, the POW problem is solved as an optimization (4) ignoring the constraints (6) (same as (3), i.e. the desired POW y* is computed for each transponder as minimization over vector of incident subcarriers y:

$$\{p^*,y^*\}=\min\|P(y)-r_p\| \tag{4}$$

Figure 6:
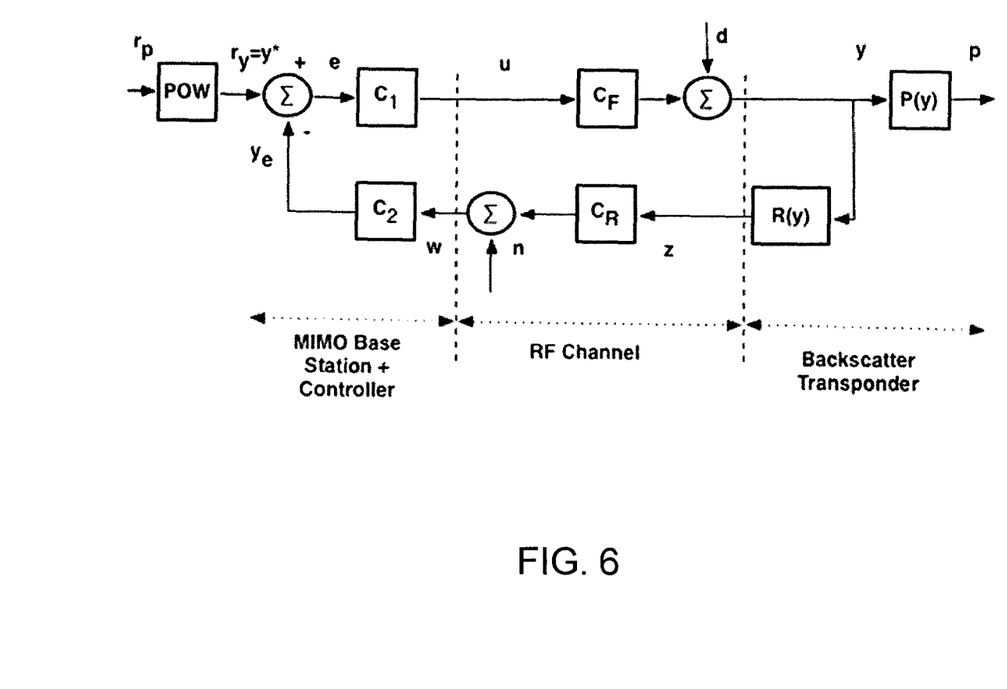
FIG. 6 illustrates one embodiment of a POW-tracking (enforcing) closed-loop control system.

Next, knowing the power-optimized waveform (POW) y* corresponding to the optimal power target p*, a feedback control system can be designed (5) that attempts to enforce the desired POW y* in presence of control (RF power) constraints (6), disturbances d, and measurement noise n. FIG. 6 illustrates one embodiment of a POW tracking (enforcing) closed-loop control system.

$$\{u^*\}=\min\|y^*-C_F u+d\| \tag{5}$$

$$F(u) \leq p_{TX\,max} \tag{6}$$

Other feedback control methods may be used. In one embodiment, in the case when all transponders are either in the harvesting mode, or in the communications mode, the backscatter block $R_n(y_n)$ can be approximated by a constant diagonal matrix of linear (constant) gains:

$$R_n(y_n)=\mathrm{diag}\{rr_{n,k}\}.$$

In one embodiment, in case of relatively narrowband waveforms and frequency-independent backscatter impedances, a transponder gain factor $R_n(y_n)$ is reduced to a K×K unity matrix $I_K$ multiplied by a scalar complex gain factor $rr_n$, those gain factor magnitudes typically in <1.0e-3 range, If the control (RF power) constraints (3), (6) is also ignored, then the separation principle applies, and the system can be designed as a Linear-Quadratic-Gaussian control system (LQG), which is well-known in the art, e.g. Athans M. (1971). "The role and use of the stochastic Linear-Quadratic-Gaussian problem in control system design". *IEEE Transaction on Automatic Control*. AC-16 (6): 529-552. doi:10.1109/TAC.1971.1099818, or Green M., Limebeer D., Linear Robust Control, Prentice Hall, 1995. In this case, the estimator $C_2$ is essentially a Kalman filter, and the controller $C_1$ is a Linear Quadratic Regulator (LQR).

Figure 7:
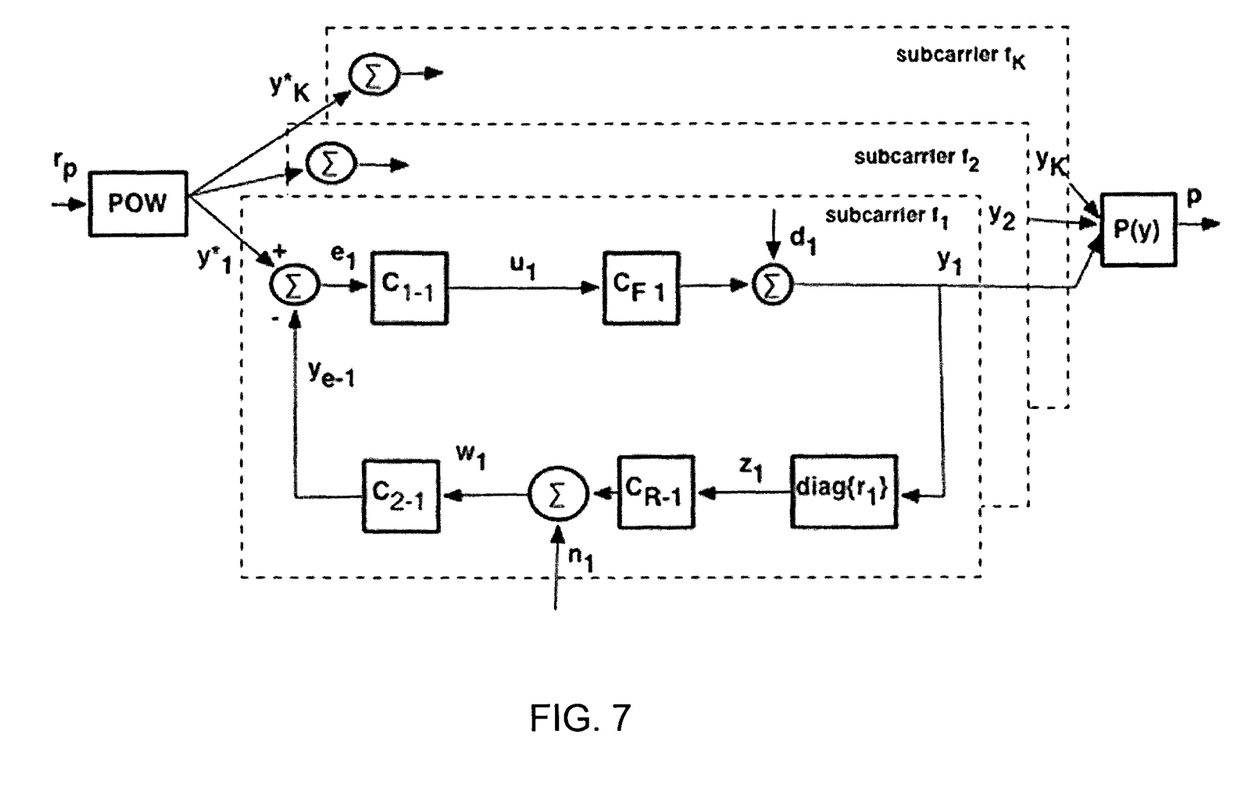
FIG. 7 illustrates one embodiment of a POW-tracking (enforcing) closed-loop control system with a decoupled subcarrier tracking subsystem.

In one embodiment, the channel gain matrices $C_F$ and $C_R$, have a special sparse structure, resulting from the fact that the RF channel is considered as linear and memory-less media. Because of this property. the off-diagonal elements coding cross-product between subcarrier channels are zero-terms, and the control system is naturally de-coupled between subcarriers into N parallel control systems, one per subcarrier. FIG. 7 illustrates one embodiment of a POW-tracking (enforcing) closed-loop control system with decoupled subcarrier tracking subsystem. Referring to FIG. 7, subcarrier channels in this case are coupled only at the tag level via the harvester model P(y) and via the POW solver block, the two being outside of the feedback control loop. The other sources of indirect coupling are the control (RF power) signal constraints (3), (6) enforced in the MIMO base station transmitters. In this case, the optimal control problem can be further simplified by reducing it to a set of control problems of lower dimensions, set for individual subcarriers. According to the control system diagram in FIG. 7, the optimization problem (4)-(6) in this case is still a two-step procedure, but in stage 2 the single large (NK)×(NK) problem is replaced with K-set of N×N problems, that are easier with which to work.

First, the desired Power Optimized Waveform is computed $y_r = [y_{r1} y_{r2} y_m]$ Next, the waveform is enforced at the tags, one subcarrier at a time, i.e. a K-set of single-subcarrier enforcing control systems as shown, for example, in FIG. 7.

Here, the control problem of equation (5) is replaced with a set of equivalent control problems of the form (7), each solved per subcarrier k, k=1,K for a control vector $u_k$ $$\{u_k^*\} = \min \|y_k^* C_{F-k} u_k + d_k\| \| k=1 \ldots K \quad (7)$$

The matrix-vector notations is slightly different, reflecting the per-carrier nature of each of the K control loops. The newly-defined vectors and matrices are grouped per subcarrier k:

$u_k$ is a L×1 control vector per subcarrier frequency $f_k$.

$C_{F-k}$ is a L×N forward complex-valued channel gain matrix per subcarrier frequency $f_k$.

disturbance vector $d_k$ is a N×1 complex vector comprised of incident RF tones from "rogue" RF devices, each vector $d_k$ describing amplitudes and phases of cumulative disturbance at each transponder $BT_n$ per subcarrier frequency $f_k$.

$y_k$ is a N×1 output vector of incident energy per subcarrier frequency $f_k$ at transponder set $\{BT_n\}$. In one embodiment, this output vector is a linear superposition of a path-attenuated control vector $u_k$ and the disturbance $d_k$, again per subcarrier frequency $f_k$, see (5).

diag$\{r_k\}$ are diagonal matrices of transponder complex gain factors (a.k.a. differential reflection coefficient).

$z_k$ is a N×1 vector of backscattered subcarrier k.

$C_{R-k}$ is M×N return complex-valued channel gain matrix.

$n_k$ is a M×1 complex vector of measurement noise at receivers $\{RX_m\}$.

$w_k$ is a M×1 vector of noisy measurements at the MIMO base station, it is a linear superposition of the return-path-attenuated backscatter $z_k$ and the noise $n_k$.

$r_p = [r_{p1} \ldots r_{pN}]$ is a N×1 reference (target) vector of harvestable power for transponders 1 to N.

$y_{e-k}$ is a N×1 estimate of harvested power produced from the measured noisy backscatter vector $w_k$ by a dynamic estimator block $C_{2-k}$ of size N×M.

$e_k$ is a N×1 tracking error vector resulting from closing the negative feedback loop, $e=r_y-y_e$.

Finally, $C_1$ is a dynamic forward controller block N×L that generates a control vector $u_k$ from the tracking error $e_k$.

Similar to the control system in FIG. 6, well-established control techniques can be used to solve the optimal tracking problem, for each sub-carrier $f_k$, such as, for example, the Linear-Quadratic-Gaussian (LQG) technique, the H-infinity control, etc.—See Skogestad, Sigurd; Postlethwaite, Ian (2005), *Multivariable Feedback Control: Analysis and Design* (2nd ed.), Wiley, ISBN 0-470-01167-X Finally, there are several approaches to addressing the control vector (transmitter RF power) constraints of the form (2), (5), introducing non-linearity into the control loop. In one approach, the linear problem can be solved, temporarily ignoring the control vector constraints, and then reducing the control vector u* by a scalar factor from 100% down until the constraints are found to be met. This may be problematic in the face of significant destructive disturbances d. In another approach, the nonlinear control vector constraints can be approximated as a time-varying gain matrix cascaded with the controller block $C_1$, a techniques well known in solving LQG for nonlinear control problems. In yet another approach, to attack the nonlinearity directly, well-known techniques like the Extended Kalman Filter, the Unscented Kalman Filter, the Robust Extended Kalman Filter, and variations of those can be applied, e.g., see Simon, Dan (2006), *Optimal State Estimation: Kalman, H-infinity, and Nonlinear Approaches*, Wiley.

Thus, the real-time wireless power transfer optimization techniques enforce the prescribed amount of energy harvested by a passive sensor tag with a backscattering transponder by use of a multitude of RF energy transmitters and receivers organized in a system of one or several MIMO base stations. In one embodiment, the potentially optimum level of harvested energy is achieved by enforcing an individually-optimal Power-Optimized Waveform at each transponder. This is achieved by a close-loop control system which is dynamically manipulating (setting) amplitudes and phases for all subcarriers emitted by each transmitter of a MIMO base station or stations, in order to enforce the optimal amplitude and phase alignment of subcarriers at each transponder. In other words, the system of MIMO base stations enforces power-optimized waveforms (POW) at each transponder according to the desired harvested energy target in real time, in presence of ambient RF disturbances, measurement noise, variations of RF propagation conditions, and scheduled changes in harvested energy targets.

Furthermore, the proposed technique enforce the power-optimized incident waveform in real time in presence of waveform distortions at the transponder caused for disturbance from "rogue" RF energy sources. The waveform correction is achieved by use of a feedback control system designed to reject noise and suppress disturbances.

Moreover, the proposed technique deliver prescribed level of incident energy in the form of power-optimized waveform at each transponder, rather than incident energy with arbitrary spectral content by enforcing the incident power-optimal waveform (POW) for a prescribed target value of harvested energy. The case of denying power to a transponder is the trivial case of zero reference power for particular transponder in the power reference vector $r_p$.

Measuring the Incident Waveform and Closed-Loop Observability and Controllability With linear, stationary, memory-less RF channel, the incident waveform is measured. The following equations may be used to represent the transmitted waveform over the RF channel, the incident waveform at the tag, and the backscatter measured at the receiver of the base station.

Figure 9:
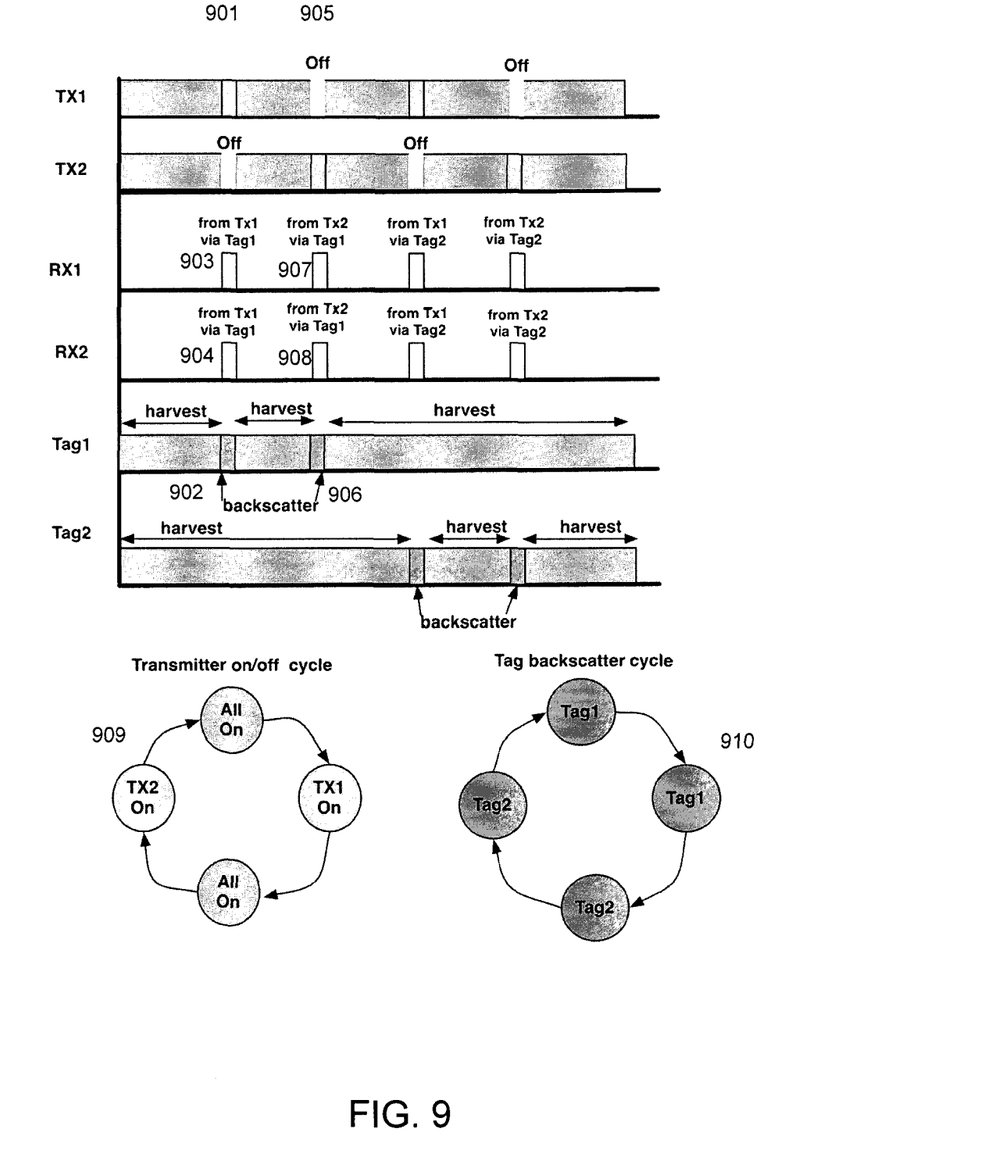
FIG. 9 illustrates one embodiment of a scheduling scheme for backscatter measurements.

TX$_l$ at subcarrier frequency w$_k$
$u_{l-k}$: $u_{l-k}(t)=|u_{l-k}|\sin(\omega_k t+\arg(u_{l-k}))$
Incident wave at tag n y$_{n-k}$
$y_{n-k}=c_{F-k\ n,l}\cdot u_{l-k}$
"Backscatter" measured at RX$_m$ w$_{m-k}$
$w_{m-k}=c_{R-k\ m,n}\cdot r_{l-k}\cdot y_{l-k}$ In matrix notation for all subcarriers, the incident waveform, waveforms measured at the base station receiver, and the harvestable power may be represented respectively, as:

$y_n=\text{diag}\{c_{F-k\ n,l}\}u_l$ $w_m=\text{diag}\{c_{Rm,n}\}R_n(y_n)$ $p_n=P_n(y_n)$ Using generalized matrix notation, these quantities are:
$y=C_F u$, $p=P(y)$, $w=C_R R(y)$ FIG. 9 illustrates one implementation with naive round-robin scheduling for measurements. Referring to FIG. 9, transmitter TX1 is all on and there is a point when it is transmitting while transmitter TX2 is not transmitting (901). Tag1 receives transmitted waveforms from both TX1 and TX2 and feeds it into harvester, until the time when TX$_2$ turns off (901). At this point, Tag1 backscatters the incident waveform from TX1 (902), and this backscatter is picked up by receivers RX1 (903) and RX2 (904). In the next time interval, transmitter TX1 turns off (905), at which point again the Tag1 backscatters (906), and the backscattered signal is picked up by receivers RX1 (907) and RX2 (908). The cycle repeats again, with transmitters TX1 and TX2 alternatively turning on and off (909), but in this case it is Tag2's turn to backscatter.

In this embodiment, all transmitters (TX) are turned on for t sec (harvesting) and only one TX is turned on for T sec (backscatter/measurement). As a result, the following backscatter occurs:
 RF waveform from TX$_1$ is backscattered by Tag$_1$ and picked up by each receiver {RX$_1$ RX$_2$}
 Next, RF waveform from TX$_2$ is backscattered by Tag$_1$ and picked up by each receiver {RX$_1$ RX$_2$}
 Next, RF waveform from TX$_1$ is backscattered by Tag$_2$ and picked up by each receiver {RX$_1$ RX$_2$}
 Finally, RF waveform from TX$_2$ is backscattered by Tag and picked up by each receiver {RX$_1$ RX$_2$}
 Thus, a single cycle of measurement is complete in $T=(t+\tau)\times N_{tags}\times L_{TX}$ seconds
 TX/Tag synchronization can be achieved via some kind of "side channel", e.g. a trivial "query" command in case of RFID tags
 A unique Tag ID can be encoded/decoded via backscatter, or via some side channel. Global uniqueness is not required, the ID has to be uniques only within the current tag population.
 Measurement system un knowns $N_{tag}(M_{RX}+L_{TX})$
 Equations $N_{tag}\ M_{RX}\ L_{TX}$
 The system of equations is well-defined or over-defined if $(M_{Rx}+L_{TX})\leq(M_{RX}\ L_{TX})$
 If receiver and transceiver pair antennas are collocated (i.e. RXi and TXi are collocated), this measurement schemes results in forward channel gain matrix $C_F$ (from TX to tags), and the return channel gain matrix $C_R$ (from tags to receivers) related by a simple transposition operator, i.e. $C_F=C_R^T$. Hence the system of measurement equations is over-defined if $M_{Rx-TX}>1$ To further illustrate this point, consider the case when transmitter/receiver pairs are collocated, TX1 is on, and Tag1 backscatters. The three equations describing this systems are signals {$w_{RX1}$, $w_{RX2}$ received by base station antennas RX1, RX2 is described by two equations in two unknowns $c_{F11}=C_{R11}$ and $c_{F21}=C_{R12}$ $w_{RX1}=c_{F11}r_1 c_{F11}u_{TX1}$ $w_{RX2}=c_{F12}r_1 c_{F11}u_{TX1}$ Once the round-robin cycle completes, the measurements are described by a system of 4×2 equations with 4 unknown channel gain coefficients, i.e. elements of 2×2 matrix $C_F$ (or $C_R$).

If the transmitter/receiver pairs are not collocated, similar equations result, but now forward and return channel gain matrices $C_F$ and $C_R$ are independent, and the result is with (4×2) equations and (4×2) unknowns, this is still a tractable problem.

If, however, both TX1 and TX2 are allowed to stay on when a single tag (Tag1 or Tag2) is backscattering, this results in only 2×2 equations, and still 4×2 unknowns, so now the system is under-determined, and the closed-loop system will be only partially observable and/or controllable.

Further with both TX1 and TX2 on, and Tag 1 and Tag 2 allowed to backscatter at the same time, this results in the system of 2 equations describing the incident waveform at the tag, in terms of backscatter waveforms measured at the base station(s) receiver(s)

$w_{RX1}=c_{R11}r_1(c_{F11}u_{TX1}+c_{F12}u_{TX2})+c_{R12}r_2(c_{F21}u_{TX1}+c_{F22}u_{TX2})$ $w_{RX2}=c_{R21}r_1(c_{F11}u_{TX1}+c_{F12}u_{TX2})+c_{R22}r_2(c_{F21}u_{TX1}+c_{F22}u_{TX2})$

This system has 2 equations with 8 unknowns, so it is thus under-determined.

In general, when designing the algorithm for measurement or estimation of incident waveforms, one will use the notion of observability, as well-known in the control theory, e.g., Brockett, Roger W. (1970). *Finite Dimensional Linear Systems*. John Wiley & Sons. ISBN 978-0-471-10585-5.

A Wi-Fi Communication System

In one embodiment, the base station(s) and tags described above are part of a Wi-Fi wireless communication system. In the Wi-Fi communication system, communications occur at 2.4 GHz and/or 5.8 GHz. Note that in alternative embodiments, communications in the wireless communication system occur at other radio frequencies.

In one embodiment, the Wi-Fi communication system is used as part of an intelligent sensor network having one or more sensor tags. The sensor tags harvest and store RF energy (e.g., Wi-Fi, cellular, etc.), collect and process sensor data, and communicate with other devices (e.g., Wi-Fi devices) using a communication standard (e.g., Wi-Fi, Zigbee, Bluetooth, Bluetooth Low Energy), or even proprietary interfaces. In one embodiment in which the sensor tags communicate via Wi-Fi, the sensor tag communicates with another Wi-Fi device by sending standard UDP packets. In another embodiment in which the sensor tags ultimately communicate via Wi-Fi, the sensor tag communicates using backscatter communication (a backscatter to Wi-Fi bridge is used in this case). Wi-Fi devices perform energy harvesting and storage and utilize a wake-up and command protocol to wake-up, perform sensing and communicate using standard communication (e.g., Wi-Fi, or Bluetooth Low-Energy). In one embodiment, the sensor tag also performs operations (e.g., commands) that may or may not be based on the sensed data.

In one embodiment, the intelligent sensor network includes low-power Wi-Fi sensor tags that use a low-power state machine to control their operation. The sensor tag includes an antenna coupled to a switch. Impedance matching circuits on the outputs of the switch may include a passive network of components to improve energy transfer from a source impedance to a load impedance. In one embodiment, the impedance matching circuits are LC circuits. The switch has a terminal coupled to RF radio via an impedance matching circuit. In one embodiment, the RF radio is an 802.11 Wi-Fi radio, such as a radio from GainSpan of San Jose, Calif. The RF radio may be coupled to a microprocessor. Another terminal of switch is also coupled to an energy harvesting and storage circuitry via an impedance matching circuit. Energy harvesting and storage circuitry is used to provide power to the microprocessor and the sensors. In one embodiment, the energy harvesting and storage circuitry includes an energy harvesting unit and a storage unit. The harvesting circuitry may include a diode based rectifier for converting incoming RF energy to a DC voltage. In some embodiments, the diode based rectifier may include Schottky diodes such as those manufactured by Avago Technologies Inc. The harvesting circuits may also include energy management functions based on discrete implementations known to those familiar with the state of the art, or they could use parts such as the Maxim 17710 or the Linear Technology LTC3108. The storage unit can be a capacitor, super-capacitor, or any type of rechargeable battery technology such as, for example, a Thinergy MEC201. The tag material itself can be a standard printed circuit board, or a flexible tag printed on film such as modern standard RFID tags.

The sensors include one or more sensors that sense data and provide sensed data to microprocessor. In one embodiment, the sensors comprise one or more temperature, pressure, humidity, gas composition, image, and position sensors. The energy harvesting and storage circuitry receives energy via the antenna through the switch and the impedance matching circuit during energy harvesting. Energy harvesting may occur when the microprocessor is asleep, and need not occur when the microprocessor is communicating. The energy harvested is stored in an energy storage device such as, for example, a capacitor or battery. In one embodiment, when the tag is performing computations or other functions, apart from energy harvesting, the harvesting energy and storage circuitry provides power to the microprocessor.

In one embodiment, the tag includes a transmitter for communication and a backscatter transponder that only supports the power distribution of the tag. Alternatively, the backscatter transponder could also provide communication capabilities for the tag. In one embodiment, an RF base station may be included in the system and be used only to provide power delivery.

An Example of a Base Station

Figure 8:
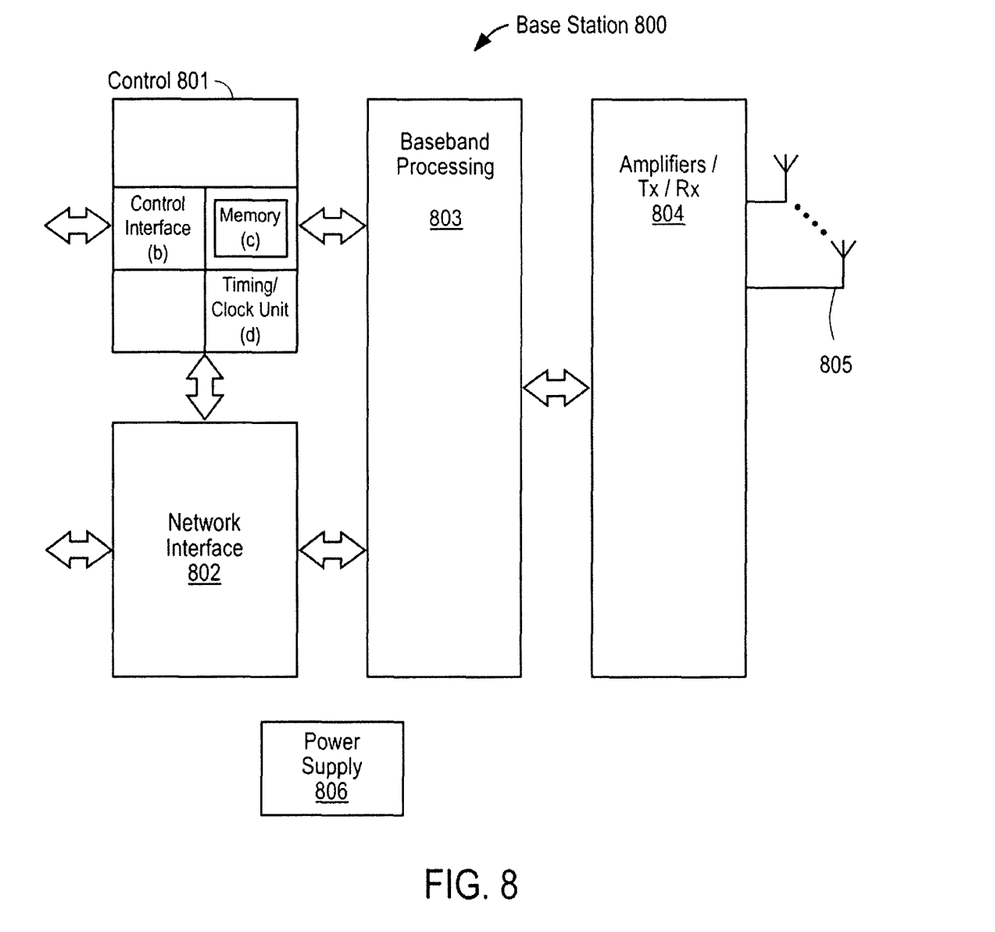
FIG. 8 is a block diagram of one embodiment of a base station.

FIG. 8 is a block diagram of one embodiment of a base station that performs one or more of the functions described above. Referring to FIG. 8, the base station 800 includes a control 801 coupled to a network interface 802 and baseband processing 803. Baseband processing 803 is also coupled to network interface 802 and amplifiers/Tx/Rx 804, which comprises the transmitter(s) and receiver(s) of the base station, along with their amplifiers, and these are coupled to antennas 805. These operate in a manner well-known in the art. The transmitters transmit RF waveforms (e.g., POWs), and the receivers receive and measure incident waveform signals, as described above. In one embodiment, a receiver measurements are run through some kind of estimation algorithm running in baseband processing module 803. In one embodiment, such an algorithm is not embedded in the baseband processing module. A power supply 806 also provides power to components of base station 800.

Control 801 includes a control interface 801(*b*) to send and receive control information to control other base stations or antenna controllers. Processor(s) 801(*a*) control, or cause to be controlled, many of the base station's operations (or operations of other base stations). In one embodiment, control 801 receives the measurements and determines adjustments that need to be made to the RF waveform (e.g., POWs). Control 801 generates a waveform with those adjustments to be transmitted through transmitters 804 using antennas 805.

In one embodiment, processing unit 801(*a*) operates as a controller to collect all channel information, perform scheduling and determining which base stations in the cluster will jointly transmit with each other. (Note that alternatively these control functions could be implemented in a device outside of a base station and control all base stations in one (or more) clusters.)

Memory 801(*c*) stores instructions to perform the functions described herein and other data. A timing/clock unit 901(*d*) provides timing and/or clocking for the base station, in a manner well-known in the art.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless power distribution system comprising:
   an RF-energy harvesting sensor tag operable to generate a first backscatter signal; and
   at least one base station operable to deliver RF power to the sensor tag by emitting a first waveform comprising a plurality of subcarriers in an RF channel,
   wherein the first backscatter signal is generated by the sensor tag by modulated scattering of the first waveform as incident upon the sensor tag,
   and further wherein the at least one base station controls energy harvested by the sensor tag by subsequently emitting a second waveform determined at least in part by a closed-loop feedback control algorithm responsive to measurements of the first backscatter signal, where the at least one base station selects the second waveform to compensate for impairments in the RF channel so that the sensor tag receives an incident waveform as a result of the emitted second waveform, the incident waveform substantially resembling the first waveform as emitted by the at least one base station prior to selecting the second waveform.

2. The wireless power distribution system defined in claim 1 wherein amplitudes and phases of each of the plurality of subcarriers are selected so as to increase output of a nonlinear energy harvester collecting energy.

3. The wireless power distribution system defined in claim 1 wherein the second waveform is selected to increase a ratio of harvestable power versus incident power in comparison to the first waveform.

4. The wireless power distribution system defined in claim 1 wherein the measurements comprise amplitude and phase of at least one subcarrier of the first backscatter signal.

5. The wireless power distribution system defined in claim 1 wherein the at least one base station selects the second waveform by adjusting amplitude and phase of the first waveform.

6. The wireless power distribution system defined in claim 1 wherein the at least one base station selects the second waveform by adjusting the first waveform to compensate for one or more of a group consisting of: variations in channel gains between the at least one base station and the sensor tag, RF disturbance noise, RF measurement noise, and changing harvested energy targets.

7. The wireless power distribution system defined in claim 1 wherein the at least one base station selects the second waveform by adjusting the first waveform to enforce the incident waveform at the sensor tag for a prescribed target value of harvested energy.

8. The wireless power distribution system defined in claim 1 wherein the sensor tag comprises an RFID tag or an RF energy harvesting sensor node.

9. The wireless power distribution system defined in claim 1 wherein the at least one base station comprises a multi-input multi-output (MIMO) base station.

10. A method for delivering power to an RF-energy harvesting backscatter sensor tag, the method comprising:
- transmitting, using a transmitter of a base station, a first waveform in an RF channel;
- measuring, using a receiver of the base station, a backscattered signal from the sensor tag, the backscattered signal resulting from the sensor tag performing modulated scattering of the first waveform as incident upon the sensor tag;
- computing adjustments to the first waveform based on measurements of the backscattered signal to compensate for impairments in the RF channel and applying the adjustments to create a second waveform; and
- transmitting the second waveform to the sensor tag so that the sensor tag receives an incident waveform as a result of the transmitted second waveform, the incident waveform substantially resembling the first waveform as transmitted by the base station prior to creating the second waveform.

11. The method defined in claim 10 wherein measuring the backscattered signal comprises measuring amplitudes and phases of subcarriers comprising the backscattered signal.

12. The method defined in claim 10 wherein the adjustments comprise amplitude and phase adjustments to subcarriers in the first waveform.

13. The method defined in claim 10 further comprising using a feedback closed-loop control algorithm to create the second waveform based on the measurements of the backscattered signal.

14. The method defined in claim 10 wherein amplitudes and phases of each of a plurality of subcarriers of the second waveform are selected so as to increase output of a nonlinear energy harvester collecting energy from the second waveform.

15. The method defined in claim 10 wherein the second waveform results in an increase of a ratio of harvestable power versus incident power in comparison to the first waveform.

16. The method defined in claim 10 wherein the first waveform is adjusted to compensate for one or more of a group consisting of: variations in channel gains between the base station and the sensor tag, RF disturbance noise, RF measurement noise, and changing harvesting energy targets.

17. The method defined in claim 10 wherein the first waveform is adjusted to create the second waveform to enforce the incident waveform at the sensor tag in response to transmitting the second waveform.

18. An article of manufacture having one or more recordable media storing instructions thereon which when executed by a system cause the system to perform a method for delivering power to an RF-energy harvesting backscatter sensor tag, the method comprising:
- transmitting, using a transmitter of a base station, a first waveform in an RF channel;
- measuring, using a receiver of the base station, a backscattered signal from the sensor tag, the backscattered signal resulting from the sensor tag performing modulated scattering of the first waveform as incident upon the sensor tag;
- computing adjustments to the first waveform based on measurements of the backscattered signal to compensate for impairments in the RF channel and applying the adjustments to create a second waveform; and
- transmitting the second waveform to the sensor tag so that the sensor tag receives an incident waveform as result of the transmitted second waveform, the incident waveform substantially resembling the first waveform as transmitted by the base station prior to creating the second waveform.

19. A base station for use in a communication system having at least one RF harvesting backscatter sensor tag, the base station comprising:
- a transmitter to transmit a first waveform and a second waveform;
- a receiver to receive a backscattered signal from the sensor tag, the backscattered signal resulting from the sensor tag performing modulated scattering of the first waveform;
- a measurement unit coupled to the receiver to obtain measurements of the backscattered signal;
- a memory coupled to the measurement unit to store the measurements; and
- a controller, coupled to the memory, the transmitter, the receiver and the measurement unit, to compute adjustments to the first waveform based on the measurements of the backscattered signal and to cause the transmitter to transmit the second waveform to the sensor tag, the second waveform representing the first waveform with the adjustments applied thereto, so that the sensor tag receives an incident waveform as a result of the transmitted second waveform, the incident waveform substantially resembling the first waveform as transmitted by the base station prior to computing adjustments to the first waveform.

\* \* \* \* \*